(12) United States Patent
Anderson et al.

(10) Patent No.: US 11,548,631 B2
(45) Date of Patent: Jan. 10, 2023

(54) MULTI MODE SAFETY SYSTEM FOR VTOL AIRCRAFT

(71) Applicant: VerdeGo Aero, Inc., De Leon Springs, FL (US)

(72) Inventors: Richard Pat Anderson, Daytona Beach, FL (US); Eric Richard Bartsch, Wilmette, IL (US)

(73) Assignee: VerdeGo Aero, Inc., De Leon Springs, FL (US)

( * ) Notice: Subject to any disclaimer, the term of this patent is extended or adjusted under 35 U.S.C. 154(b) by 56 days.

(21) Appl. No.: 16/956,959

(22) PCT Filed: Jan. 18, 2019

(86) PCT No.: PCT/US2019/014203
§ 371 (c)(1),
(2) Date: Jun. 22, 2020

(87) PCT Pub. No.: WO2019/143944
PCT Pub. Date: Jul. 25, 2019

(65) Prior Publication Data
US 2021/0403153 A1    Dec. 30, 2021

Related U.S. Application Data

(60) Provisional application No. 62/619,422, filed on Jan. 19, 2018.

(51) Int. Cl.
*B64C 29/00* (2006.01)
*B64D 17/80* (2006.01)
*B64D 25/00* (2006.01)

(52) U.S. Cl.
CPC .......... *B64C 29/0033* (2013.01); *B64D 17/80* (2013.01); *B64D 25/00* (2013.01); *B64D 2201/00* (2013.01)

(58) Field of Classification Search
CPC .... B64D 17/80; B64D 25/00; B64D 2201/00; B64D 17/54; B64D 45/06; B64C 25/56
See application file for complete search history.

(56) References Cited

U.S. PATENT DOCUMENTS 5,836,544 A    11/1998  Gentile
8,348,192 B2    1/2013  Tho et al.
(Continued)

FOREIGN PATENT DOCUMENTS

DE    102011053678 A1 *    3/2013    ............ B64D 17/80
WO       2014080409 A1        5/2014
(Continued)

OTHER PUBLICATIONS

European Patent Office, Extended Search Report issued in Appl. No. 19740743.0, Completed on Sep. 21, 2021, Received on Oct. 1, 2021, 11 pgs.
(Continued)

*Primary Examiner* — Tien Q Dinh
*Assistant Examiner* — William L Gmoser
(74) *Attorney, Agent, or Firm* — Greenberg Traurig, LLP

(57) ABSTRACT

An aircraft safety system includes impact energy reduction systems including: an aircraft parachute, at least one rotor configured for autorotation, and an energy absorbing system. An automatic control system uses data from speed and altitude sensors to selectively and sequentially deploy the impact energy reduction systems depending on the portion of the aircraft speed and altitude flight envelope in which the aircraft is operating when an emergency is detected.

20 Claims, 7 Drawing Sheets

(56) References Cited

U.S. PATENT DOCUMENTS

| | | | |
|---|---|---|---|
| 8,798,814 B1 | 8/2014 | Spenser et al. | |
| 8,870,115 B2 | 10/2014 | Lu et al. | |
| 9,266,610 B2 | 2/2016 | Knapp et al. | |
| 9,452,843 B1 | 9/2016 | Lu et al. | |
| 2005/0127238 A1 | 6/2005 | Ballew | |
| 2010/0004803 A1* | 1/2010 | Manfredi | B64D 25/00 701/14 |
| 2010/0176244 A1* | 7/2010 | Fleming, III | B64D 17/80 244/135 R |
| 2011/0204181 A1 | 8/2011 | Hill et al. | |
| 2017/0313433 A1* | 11/2017 | Ozaki | B64C 39/024 |
| 2017/0313438 A1 | 11/2017 | Martinez-Sanchez et al. | |

FOREIGN PATENT DOCUMENTS

| | | | |
|---|---|---|---|
| WO | 2017066662 A1 | 4/2017 | |
| WO | WO-2018156972 A1 * | 8/2018 | A61G 3/001 |

OTHER PUBLICATIONS

ISA/US, International Search Report and Written Opinion of the Int'l Searching Authority issued in PCT/US19/014203, dated Apr. 8, 2019, 9 pgs.

* cited by examiner

MULTI MODE SAFETY SYSTEM FOR VTOL AIRCRAFT

CROSS-REFERENCE TO RELATED PATENT APPLICATION

This application is a 371 National Stage application of International PCT Application No. PCT/US2019/014203, filed Jan. 18, 2019, which claims the benefit of U.S. Provisional Patent Application No. 62/619,422, filed Jan. 19, 2018, the entire contents of each of which are hereby incorporated by reference in their entirety.

BACKGROUND

Many vertical takeoff and landing (VTOL) aircraft, such as helicopters, are equipped with rotors capable of autorotation to act as a safety system to address emergency situations involving a loss of engine power to the rotor. These autorotation-based safety systems rely on the functionality of the rotor remaining intact and preclude safely operating in certain portions of the height-velocity diagram that may be desirable.

SUMMARY

In an embodiment, a VTOL aircraft includes multiple safety systems, such as multiple rotors, each configured for autorotation if power to the motors driving the rotors is lost; an airframe parachute that may be used to reduce descent velocity in an emergency situation; and an air bag system underneath the fuselage of the aircraft to cushion an emergency landing. An automatic emergency control system monitors aircraft performance parameters to detect emergency situations. If an emergency situation is detected, the automatic emergency control system is programmed to evaluate the specific emergency situation, the aircraft altitude, the aircraft speed, and the aircraft position with respect to obstacles to selectively and/or sequentially deploy one or more of the multiple safety systems. Deployment of the multiple safety systems depends in part on the region of the height-velocity diagram in which the aircraft is operating upon detection of the emergency situation.

In various embodiments, the multiple safety systems include rotors configured for autorotation, a parachute, and an energy absorbing structure built into the fuselage and passenger seating position.

In various embodiments, the automatic emergency control system includes programming with a threshold altitude above which the automatic emergency control system deploys the parachute if an emergency situation is detected, and below which the parachute is not be deployed.

In various embodiments, the automatic emergency control system utilizes data from sensors measuring the aircraft's height above an impact location to control the deployment of an energy absorbing system, such as an air bag underneath the fuselage.

In various embodiments, the size of the parachute is insufficient to reduce the impact speed of the aircraft below a threshold velocity for passenger safety without the assistance of other safety systems such as an airbag or autorotating rotors. In these embodiments, the weight and size of the parachute may be minimized, making the aircraft more efficient.

In various embodiments, the programming of the automatic emergency control system contains pre-programmed regions of the height-velocity diagram in which the sequence and deployment of the multiple safety systems are dependent on the aircraft's height and velocity at the time an emergency situation is detected.

In various embodiments, the automatic emergency control system may be activated by an occupant of the aircraft detecting an emergency situation and interfacing with the automatic emergency control system via a user interface.

In various embodiments, the rotors configured for autorotation comprise collective control systems but not cyclic control systems.

In various embodiments, the automatic emergency control system provides an emergency signal to a pilot upon detection of an emergency situation. A time interval is provided such that the pilot may override the automatic deployment sequence of the multiple safety systems. The time interval provided to the pilot depends on the region of the height-velocity diagram in which the aircraft is operating upon detection of the emergency situation, the location of the aircraft with respect to obstacles, and the nature of the emergency situation detected.

In various embodiments, the pilot is located remotely from the aircraft and is provided an emergency signal via wireless communication.

In various embodiments, the automatic emergency control system may be activated by a pilot operating the aircraft remotely detecting an emergency situation and interfacing with the automatic emergency control system via a user interface and wireless communication.

In various embodiments, the multiple safety systems include wings configured to provide aerodynamic lift to allow the aircraft to glide when sufficient airspeed is available.

In various embodiments, the threshold altitude for parachute deployment is dependent on airspeed.

In various embodiments, data regarding the attitude of the aircraft is used by the automatic emergency control system to influence the sequence of deployment and the timing of deployment of multiple safety systems.

In various embodiments, the threshold altitude is measured with respect to the aircraft's distance from obstacle and terrain data contained in a database.

In various embodiments, the automatic emergency control system receives data from sensors regarding distance from obstacles to assess detection of emergency situations.

In various embodiments, the automatic emergency control system utilizes sensor data to predictively identify emergency situations involving collisions with obstacles or terrain.

In various embodiments, the automatic emergency control system utilizes sensor data regarding onboard fire to sequentially deploy multiple safety systems to minimize the time it takes to safely place the aircraft on the ground.

DETAILED DESCRIPTION

Figure 1:
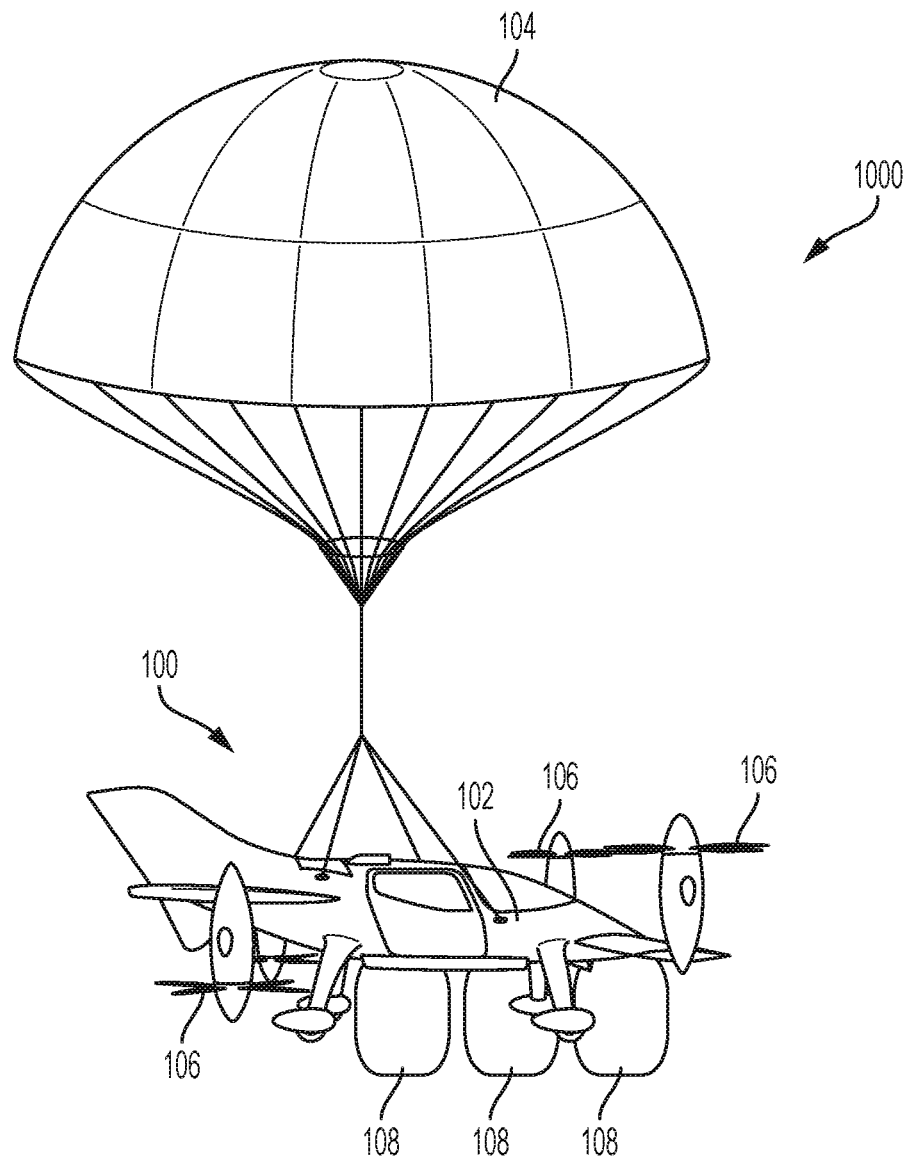
FIG. 1 is a side view of an airplane with rotors configured for autorotation, a deployed parachute, and deployed energy absorbing airbags underneath the aircraft fuselage in accordance with an illustrative embodiment.

Described herein are various embodiments of a multi-mode safety system for a vertical takeoff and landing (VTOL) aircraft utilizing one or more of an automatic emergency control system, a parachute, rotors with autorotation, and an energy absorbing system. The systems, methods, and computer readable media detailed in this description utilize a combination of multiple safety systems and an automatic emergency control system to selectively deploy one or more of the multiple safety systems when an emergency situation is detected. The multi-mode safety system advantageously provides for operation of a VTOL aircraft in a large safe operating envelope on a height-velocity diagram, and also provides added redundancy in the case of systems failures. Advantageously, the safe operating envelope of the aircraft described herein is larger than other aircraft, such as a helicopter, as discussed at length below. This advantageously allows the aircraft described herein to be operated more safely in a wider variety of conditions for takeoff, landing, and cruising, including allowing for a wider variety of altitudes and velocities the aircraft may operate safely at in those various stages of flight as compared to other types of aircraft.

There is a region of a height-velocity diagram for a helicopter, for example, where autorotation is not a viable alternative upon failure of the engine because there may be insufficient altitude and response time available to the pilot to safely enter an autorotation. Autorotation is a state of flight in which a rotor system turns by the action of air moving up through the rotor, rather than by engine power driving the rotor. Autorotation allows energy to be selectively stored in the rotor by increasing its rotational inertia, or released by pitching the rotor blades such that the rotational inertia is converted to thrust. Autorotation also may be used to adjust the aerodynamic drag of a rotor to control the descent rate of an aircraft that is descending in an unpowered manner. During autorotation, collective control of a rotor is used to store or release energy and to adjust drag. During autorotation, cyclic control is used to change the direction that the aircraft travels. As described herein, autorotation may be used to safely land an aircraft in the event of an engine failure or other emergency condition. For a helicopter, safely avoiding a region of the height-velocity diagram where autorotation is not possible is desirable. This often dictates that a flat departure profile is used for helicopters to avoid climbing significantly until there is sufficient forward airspeed. As further discussed below (e.g., with respect to FIG. 4), this can limit the departure and arrival flight profiles that can be safely flown in a VTOL helicopter relying on autorotation and can require the helicopter to fly closer to obstacles in the departure and arrival zones, creating safety risks. A multi-mode safety system as described herein is desirable to minimize the unsafe region of the height-velocity diagram and to protect the occupants of the VTOL aircraft from emergency situations other than engine failure that come with limited takeoff and landing profiles (e.g., as further described below with respect to FIG. 5).

Accordingly, vertical takeoff and landing (VTOL) aircraft with rotors as described herein are desirable to allow takeoff and landing from small areas without runways. A helicopter has a height-velocity diagram (e.g., FIG. 4) indicating the regions of height and velocity where autorotation is not a feasible means of safely landing the helicopter if power is lost. This region of the height-velocity diagram is commonly termed the dead man's curve. There are significant regions of low-speed and medium altitude operations where a helicopter is not capable of autorotating and therefore has no safety backup. Also, it is often desirable to operate a VTOL aircraft in locations where obstacles may be present near the takeoff and landing site, but a helicopter maintains a flat trajectory as it takes off or lands to ensure that it is not operating in the dead man's curve. Therefore, the goals of avoiding obstacles and remaining out of the dead man's curve may run counter to each other, making many potential takeoff or landing sites unsafe for many helicopters and other VTOL aircraft.

Autorotation is also of limited use in emergency situations not involving loss of power. If the rotor is damaged, then a helicopter may have no safe means of landing, and the odds of fatal injuries to the occupants are high if a failure occurs more than a few feet above the ground.

Parachute systems for airplanes are well known but are difficult to utilize on a helicopter. An aircraft parachute system is often deployed from the upper surface of the aircraft's fuselage, and cables attaching the parachute to the aircraft should be unobstructed for the parachute system to perform properly. However, a helicopter has rotor blades above substantially all of the fuselage, making safe placement of a parachute difficult. Parachute systems large enough to control the impact velocity of an entire aircraft are also large and heavy, making installation difficult in aircraft where both space and weight are at a premium.

A VTOL aircraft may have multiple rotors configured in many places around the airframe. While this creates benefits of redundancy and control, it also reduces the total disk area of the rotors when compared to a helicopter, making autorotation, in some instances, insufficient to safely reduce the impact energy below the threshold for survivability from all desirable portions of the height-velocity diagram.

The systems, methods, and computer readable media described herein offer multiple benefits to improve safety when compared to both a helicopter and other types of VTOL aircraft. Advantageously, the dead man's curve of the aircraft is reduced significantly, creating the ability to approach and depart at steeper initial angles, providing added obstacle clearance and safe access to an increased number of takeoff and landing sites. The described aircraft may also advantageously include redundancy from multiple safety systems including rotor autorotation, parachute, and energy absorbing systems. In the case where a rotor is damaged, the other safety systems may still bring the aircraft to the ground safely. Additionally, the use of an automatic emergency control system reduces the reaction time when deploying safety systems. Faster deployment allows the safety systems to more rapidly reduce the aircraft's velocity, thus decreasing the impact energy exerted on the passenger compartment.

FIG. 1 illustrates an aircraft 1000 configured with an airframe 100, a fuselage 102, a parachute 104, four rotors 106, and an energy absorbing system 108. In the event of an emergency where a non-standard landing is desired, a master control unit located within the aircraft 1000 may selectively deploy the parachute 104, initiate autorotation of the rotors 106, and/or deploy the energy absorbing system 108, depending on the altitude and/or airspeed of aircraft 1000. An example master control unit 700 is described below and shown in FIG. 7.

The master control unit may have some, all, and/or additional functionalities of the master control unit 700 described below, which is merely one example embodiment of a master control unit. The rotors 106 may deliver thrust horizontally, vertically, or at an angle between horizontal and vertical. The direction of the thrust delivered by the rotors 106 is dependent on an orientation/position of the rotors 106 and/or how the rotors 106 are controlled by the master control unit. Because the rotors may create thrust along an axis, and may be configured for collective and/or cyclic control, the rotors 106 may deliver thrust and torque in a variety of directions, and the rotors 106 may individually deliver thrust and torque in varying directions.

In FIG. 1, the rotors 106 are configured to deliver thrust in a substantially vertical direction, and therefore are positioned to facilitate autorotation if necessary to arrest the descent of the aircraft 1000. If the aircraft 1000 is airborne and experiences an emergency where a non-standard landing is desired, a master control unit onboard the aircraft 1000 assesses a variety of data to selectively deploy parachute 104, deploy energy absorbing system 108, and/or initiate autorotation of rotors 106. The various aspects of a safety system may be utilized and/or deployed according to the various methods, systems, and computer readable media described herein, including according to the method of FIG. 6 described below.

Discussed below are various sensors that may capture data assessed by the master control unit to determine which safety systems to initiate and/or deploy. In FIG. 1, the energy absorbing system 108 includes a series of airbags that may be rapidly deployed from the underside of the fuselage 102 to cushion the impact of the aircraft 1000 with the ground or other object. If an emergency occurs at an altitude high enough for deployment, the parachute 104 may be deployed and the rotors 106 may be positioned in the vertical thrust orientation if they are not already in that position. Both the parachute 104 and the rotors 106 reduce the descent rate of the aircraft 1000. When onboard sensors (e.g., the sensors described below with respect to FIG. 7) identify that the aircraft 1000 is close to impacting the ground, the energy absorbing system 108 may be deployed such that it is fully deployed prior to impact with the ground. The parachute 104, the rotors 106, and the energy absorbing system 108 are sized such that any two of the three systems may reduce the deceleration experienced by the occupants of the aircraft 1000, as the aircraft 1000 impacts the ground, to a level that is survivable for the occupants.

The energy absorbing system 108 in FIG. 1 is a deployable airbag. In some embodiments, the energy absorbing system 108 may be a passive crumple zone or other shock absorbing system. In embodiments where the energy absorbing system 108 is configured as a passive system, there is no need for the master control unit to activate it prior to impact. The rotors 106 may be configured for both cyclic and collective control to facilitate controlled flight during autorotation. Collective control allows the rotors 106 to store and release energy, and also provides a variable amount of aerodynamic drag on the aircraft 1000 as it descends in an emergency situation. Cyclic control allows the rotors 106 to provide directional control of the forces imparted to the airframe 100 by the rotors 106. In various embodiments, one, some, or all of the rotors 106 may be configured for only collective control and are not configured for cyclic control. Where none of the rotors 106 are configured for cyclic control, directional control of the aircraft 1000 may be achieved through differential collective control of the individual rotors 106.

Figure 2:
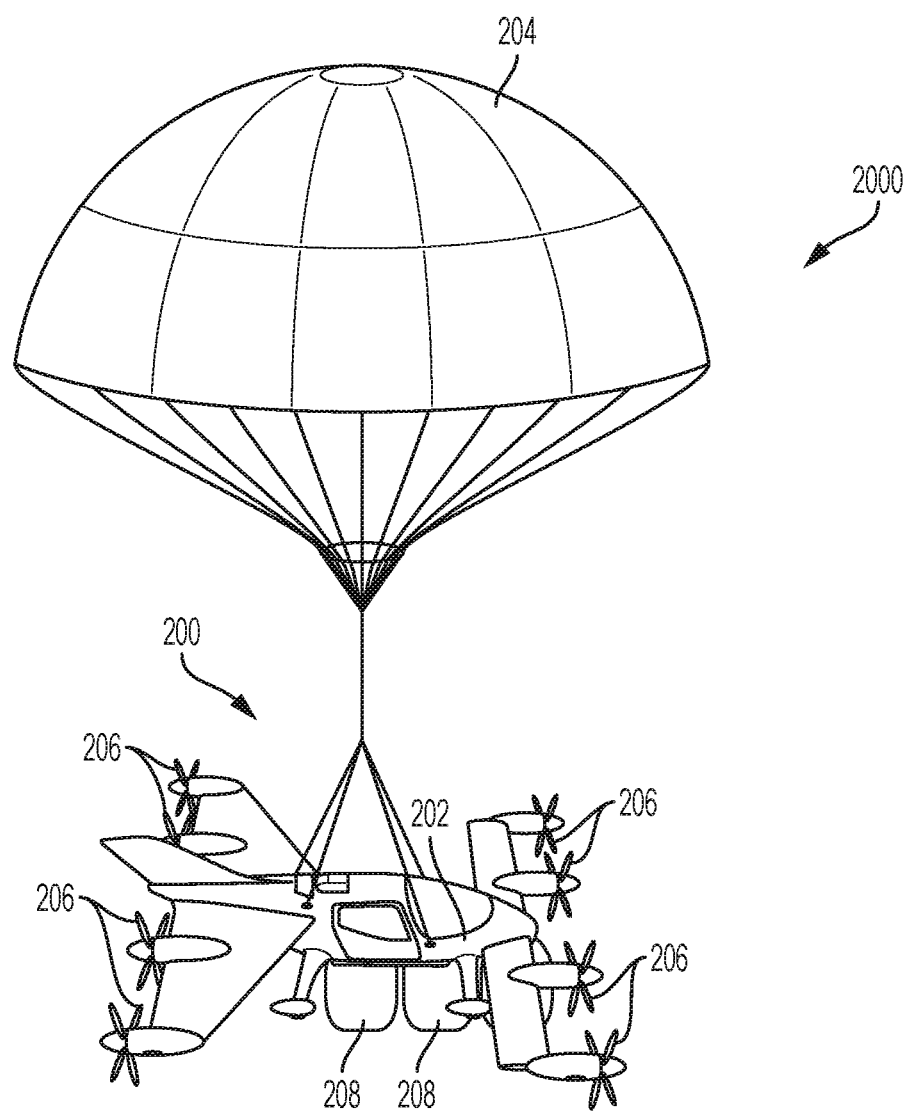
FIG. 2 is an isometric view of an airplane with a deployed parachute, deployed energy absorbing airbags underneath the aircraft fuselage, and with the rotors positioned such that autorotation is not possible in accordance with an illustrative embodiment.

FIG. 2 illustrates an aircraft 2000 configured with an airframe 200, a fuselage 202, a parachute 204, eight rotors 206, and an energy absorbing system 208. In the event of an emergency where a non-standard landing is desired, a master control unit located within the aircraft 2000 may selectively deploy the parachute 204, initiate autorotation of the rotors 206, and/or deploy the energy absorbing system 208, depending on the altitude and/or airspeed of the aircraft 2000. The master control unit may be, for example, the master control unit 700 described below with respect to FIG. 7 that may execute the method of FIG. 6, also described below. The rotors 206 may be positioned to deliver thrust horizontally, vertically, or at an angle between horizontal and vertical. In this illustration, the rotors 206 are configured to deliver thrust in a substantially horizontal direction, and are therefore positioned in a manner that precludes autorotation. In an emergency involving a loss of ability to position the rotors 206 in a substantially vertical orientation for autorotation, the parachute 204 may be utilized to arrest the descent rate of the aircraft 2000. If an emergency is detected by the master control unit, and the rotors 206 are unable to be reconfigured to implement autorotation, and the airspeed and altitude of the aircraft 2000 are such that parachute deployment is beneficial, then the parachute 204 may be deployed to arrest the descent rate of the aircraft 2000. When onboard sensors identify that the aircraft 2000 is close to impacting the ground, the energy absorbing system 208 may be fully deployed prior to impact with the ground. The combination of the parachute 204 arresting the descent rate, and the energy absorbing system 208 cushioning the impact with the ground, ensures that the passengers of the aircraft 2000 experience survivable deceleration levels during impact of the aircraft 2000 with the ground.

Figure 3:
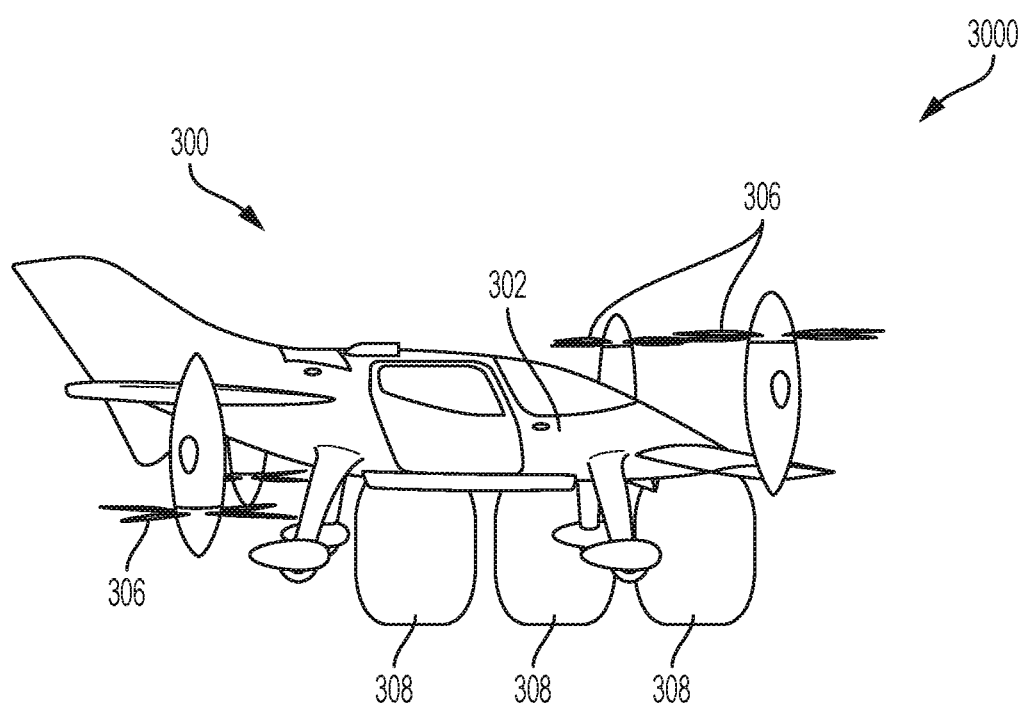
FIG. 3 is a side view of an airplane with rotors configured for autorotation and deployed energy absorbing airbags underneath the aircraft fuselage in accordance with an illustrative embodiment.

FIG. 3 illustrates an aircraft 3000 configured with an airframe 300, a fuselage 302, rotors 306, an energy absorbing system 308, and an undeployed parachute contained within the fuselage 302. If an emergency occurs at an altitude and airspeed at which it is not desirable or feasible to deploy the parachute, the master control unit positions the rotors 306 in a substantially vertical orientation to facilitate autorotation. The autorotation of the rotors 306 reduces the descent rate of the aircraft 3000 and facilitates directional control of the aircraft 3000 to allow selection of a suitable emergency landing location. The master control unit varies the cyclic and/or collective control of the rotors 306 to reduce the descent speed and position the aircraft 3000 over a desirable emergency landing location. Immediately above the emergency landing location, the energy absorbing system 308 may be deployed to reduce the impact deceleration of the aircraft 3000. The combination of the reduction in descent speed from the autorotation of the rotors 306, and the reduction in deceleration from the energy absorbing system 308, reduces the deceleration experienced by the passengers of the aircraft 3000 during impact to a level that is survivable.

In various embodiments, the placement of the parachute and configuration of the parachute is such that the deceleration caused by deploying the parachute is designed to be imparted on the aircraft, including on the passenger seating position, in a manner that keeps the deceleration of the aircraft below a predetermined threshold. In this way, the deployment of the parachute does not cause the aircraft to decelerate too quickly. That is, the maximum parachute deceleration imparted on the aircraft, including to the passenger seating position, is below a deceleration threshold. This may be accomplished using various parachute styles and deployment methods. The energy absorbing system is also designed and placed to impart a maximum energy absorbing system deceleration on the aircraft, and primarily to the passenger seating position. The energy absorbing system may also be designed such that a maximum energy absorbing deceleration is below a particular threshold. In various embodiments, the maximum energy absorbing deceleration threshold may be substantially similar to or different from the threshold of the maximum parachute deceleration. Such configurations and designs provide for maximum safety of any passengers. For example, if an aircraft is damaged (e.g., loses a wing), the parachute and energy absorbing system should still be attached to and provide deceleration to the passenger seating position, rather than some other portion of the aircraft (e.g., the portion of the aircraft that is detached from the passenger seating position). The energy absorbing system also provides deceleration primarily to the passenger seating position. In this way, for example, in a crash or impact event, if the aircraft breaks apart, the deceleration of other parts of aircraft than the passenger seating position as the aircraft breaks apart need not be maintained below a threshold for survivability. Accordingly, the safety systems are designed and configured to provide their maximum deceleration to the passenger safety position rather than some other portion of the aircraft which may separate from the passenger seating position upon impact. In various embodiments, the magnitude of the maximum parachute deceleration may be substantially similar to the magnitude of the maximum energy absorbing system deceleration. In this way, if one of the parachute or the energy absorbing system is not deployed or used in an emergency situation for any reason (e.g., cannot be used based on the altitude and velocity of the aircraft, cannot be used because of inoperability or damage, etc.), the system that is deployed/used can still provide a magnitude of deceleration that is similar to the system that is not deployed/used. In other embodiments, the magnitude of the maximum parachute deceleration may be different from the magnitude of the maximum energy absorbing system deceleration.

Figure 4:
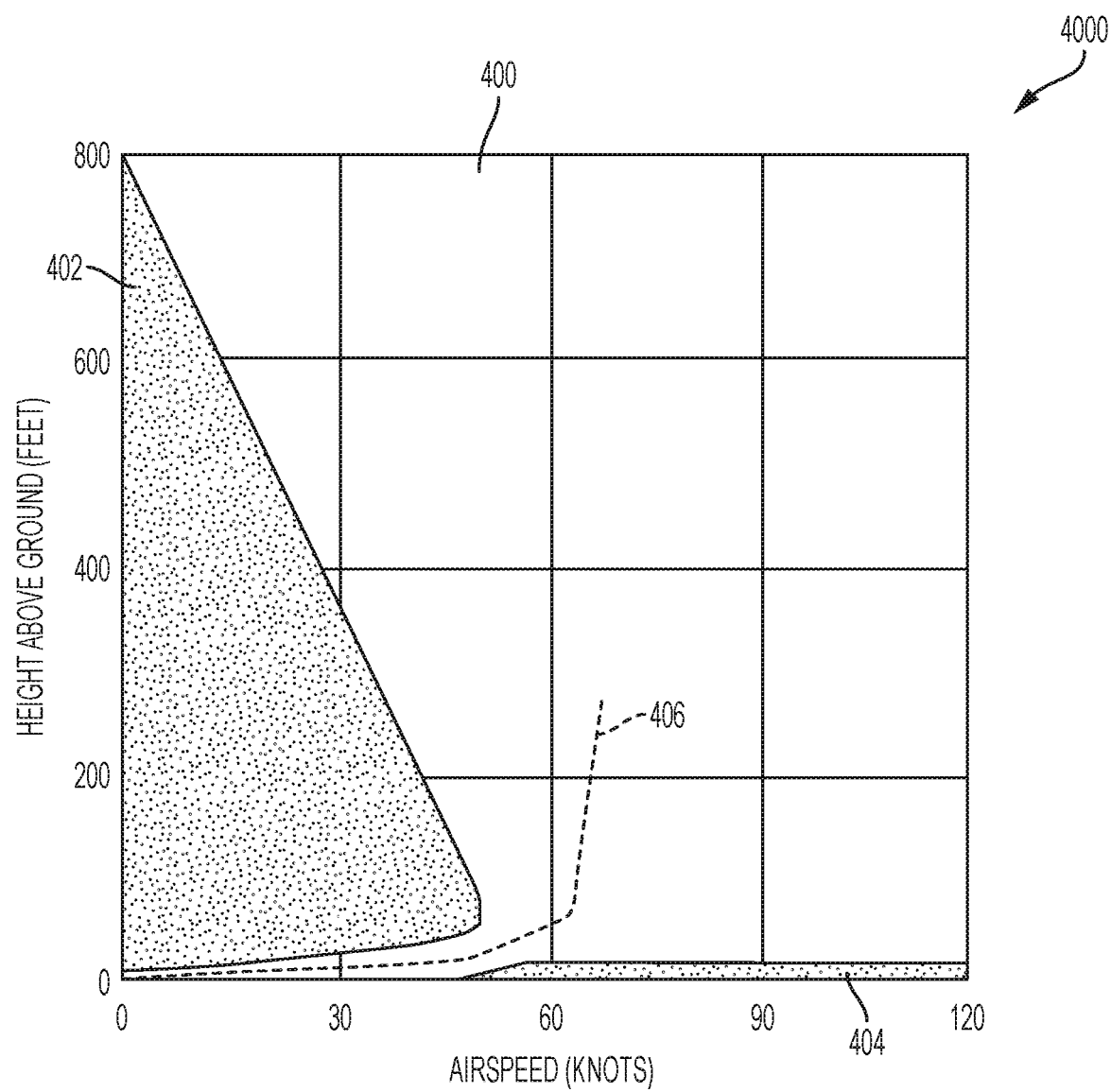
FIG. 4 is a height-velocity diagram for a helicopter.

FIG. 4 illustrates an example of a height-velocity diagram 4000 for a helicopter. The unshaded region 400 represents the combinations of airspeed and altitude in which the helicopter is capable of autorotating to the ground with an impact deceleration that is survivable. Region 402 represents combinations of airspeed and altitude in which safe autorotation is not feasible due to the combination of relatively low airspeed and altitude being insufficient to safely arrest the descent rate of the helicopter if power to the rotor is lost. The reaction time of the helicopter's pilot is also a factor in determining the size of the region 402. Region 404 represents the combinations of airspeed and altitude in which there is insufficient time to safely initiate an autorotation prior to impacting the ground if power to the rotor is lost. Flight profile 406 represents a typical departure or arrival for a helicopter. The helicopter must remain close to the ground as it accelerates to avoid being too high for a safe landing at low speed. Once the helicopter has accelerated sufficiently to have enough energy stored in its rotor, then it may begin to safely climb. Therefore, a helicopter utilizes a substantially horizontal departure and arrival path at the beginning and end of each flight, which may be challenging in locations where there are obstacles near a takeoff/landing location. Often, the operation of a helicopter involves safety compromises between avoiding the region 402 and maintaining clearance from obstacles near the helicopter. Alternatively, some locations may be unsuitable for a safe departure or arrival in a helicopter.

Figure 5:
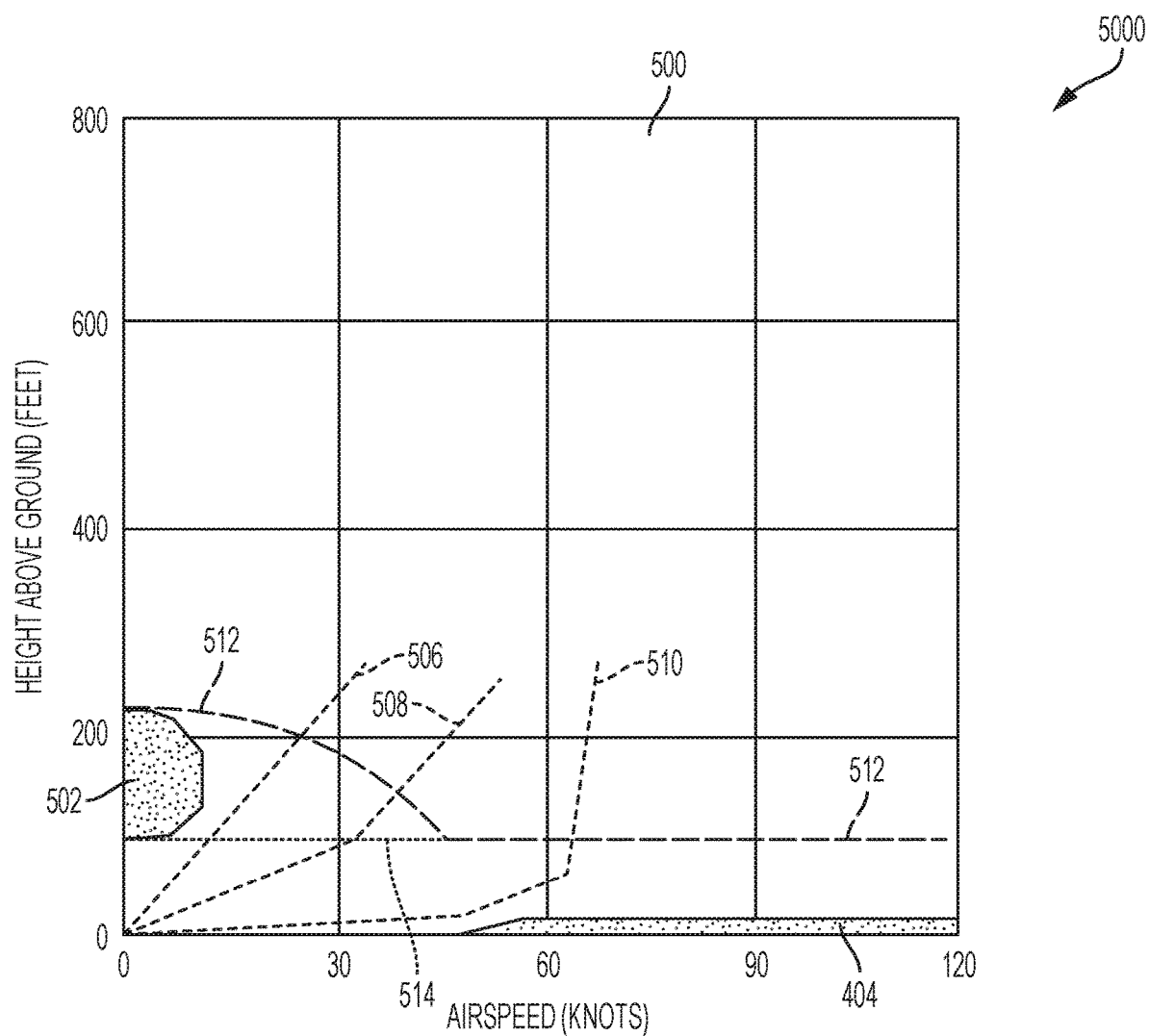
FIG. 5 is a height-velocity diagram for an aircraft equipped with an automatic emergency control system, a parachute, an energy absorbing system, and rotors configured for autorotation in accordance with an illustrative embodiment.

FIG. 5 illustrates a height-velocity diagram 5000 for an aircraft utilizing the multi-mode safety systems, methods, and computer readable media described herein. The unshaded region 500 represents the combinations of airspeed and altitude in which the aircraft is capable of safely returning to the ground during an emergency that precludes a normal landing. Shaded region 502 represents the combinations of airspeed and altitude in which the multi-mode safety system is unable to safely reduce the impact deceleration below a survivable threshold. Comparing the shaded region 502 of FIG. 5 and the shaded region 402 of FIG. 4, the region 502 advantageously provides for a larger safe operating zone (the unshaded region 500) as a result of the safety systems, methods, and computer readable media described herein. Threshold line 512 represents a combination of airspeed and altitude above which the parachute may be deployed. Below threshold line 512, the parachute may only partially deploy prior to the aircraft impacting the ground. Threshold line 514 represents the altitude below which the energy absorbing system may absorb sufficient impact energy to reduce the deceleration of the aircraft such that the impact is survivable.

The region between threshold line 512 and 514 is the region in which autorotation of the rotors is utilized to first reduce the descent velocity prior to deploying the energy absorbing system to ensure that the magnitude of the impact deceleration is below the threshold for survivability. In the example in FIG. 5, the energy absorbing system is designed to have a threshold altitude represented by threshold line 512 that is substantially identical to the altitude for deployment of the parachute above a threshold speed (i.e., the thresholds 512 and 514 are the same above a certain speed). Alternatively, in some embodiments, the substantially horizontal threshold line 514 may be entirely beneath threshold line 512 at any airspeed. Above threshold line 512, either autorotation or the parachute may be sufficient to reduce the descent rate of the aircraft to a velocity low enough for the energy absorbing system to reduce impact deceleration below the threshold for survivability. Alternatively, the combined reduction in descent velocity from both the parachute and the autorotation in the region above threshold line 512 may be sufficient to reduce the impact deceleration below the threshold for survivability without utilizing the energy absorbing system. Below threshold line 514, the energy absorbing system is configured to cushion the impact of the aircraft without the assistance of autorotation or the parachute. The reduction of the dead man's curve in the region 502 in FIG. 5 versus the region 402 of FIG. 4 is due to the inclusion of the energy absorbing system pushing the lower boundary of the region upwards with threshold line 514 while the parachute pushes the upper boundary downward with threshold line 512 and the boundary is shifted to the left through the use of an automatic control system (e.g., the ones described below with respect to FIGS. 6 and 7) that reduces the reaction time to deploy/utilize the safety systems. The implementation of the multi-mode safety features described herein therefore significantly reduces the size of the unsafe region 502 when compared to the region 402, and also offers redundant means of safely bringing the aircraft to the ground in some portions of the height-velocity diagram, while a helicopter according to FIG. 4 is entirely dependent on the functionality of a rotor system after an emergency situation has occurred. FIG. 5 merely shows one of a height-velocity diagram for an aircraft as described herein. Other varying thresholds, airspeeds, and heights are possible and contemplated according to various embodiments of this description. However, any aircraft according to the embodiments described herein may have a height-velocity diagram that has the significant advantages described herein over the height-velocity diagram of FIG. 4.

FIG. 5 also illustrates that an aircraft utilizing the multi-mode safety system has a wider array of departure and arrival paths than a helicopter or other VTOL aircraft not utilizing the multi-mode safety system. A steep departure path 506 illustrates an example departure where the aircraft climbs steeply to avoid nearby obstacles while remaining clear of the region 502 on the height-velocity diagram 5000. A mid-departure path 508 is a less steep climb than the departure path 506, and a shallow-departure path 510 is similar to the typical safe departure path of a helicopter as shown in FIG. 4. The ability for an aircraft, as described herein, to depart and/or arrive on height-velocity profiles ranging between the departure path 506 and the departure path 510 offers significantly more capability and flexibility to maneuver safely around obstacles near the takeoff and landing locations, and allows for the use of takeoff and landing locations that may not have been safe for helicopters or other VTOL aircraft. Such a variety of departure paths may not be possible to safely execute with an aircraft having the height-velocity diagram of FIG. 4. In addition to the three departure paths shown in FIG. 5, other departure paths are possible and contemplated in accordance with various embodiments of the systems, methods, and computer readable media described herein.

Figure 6:
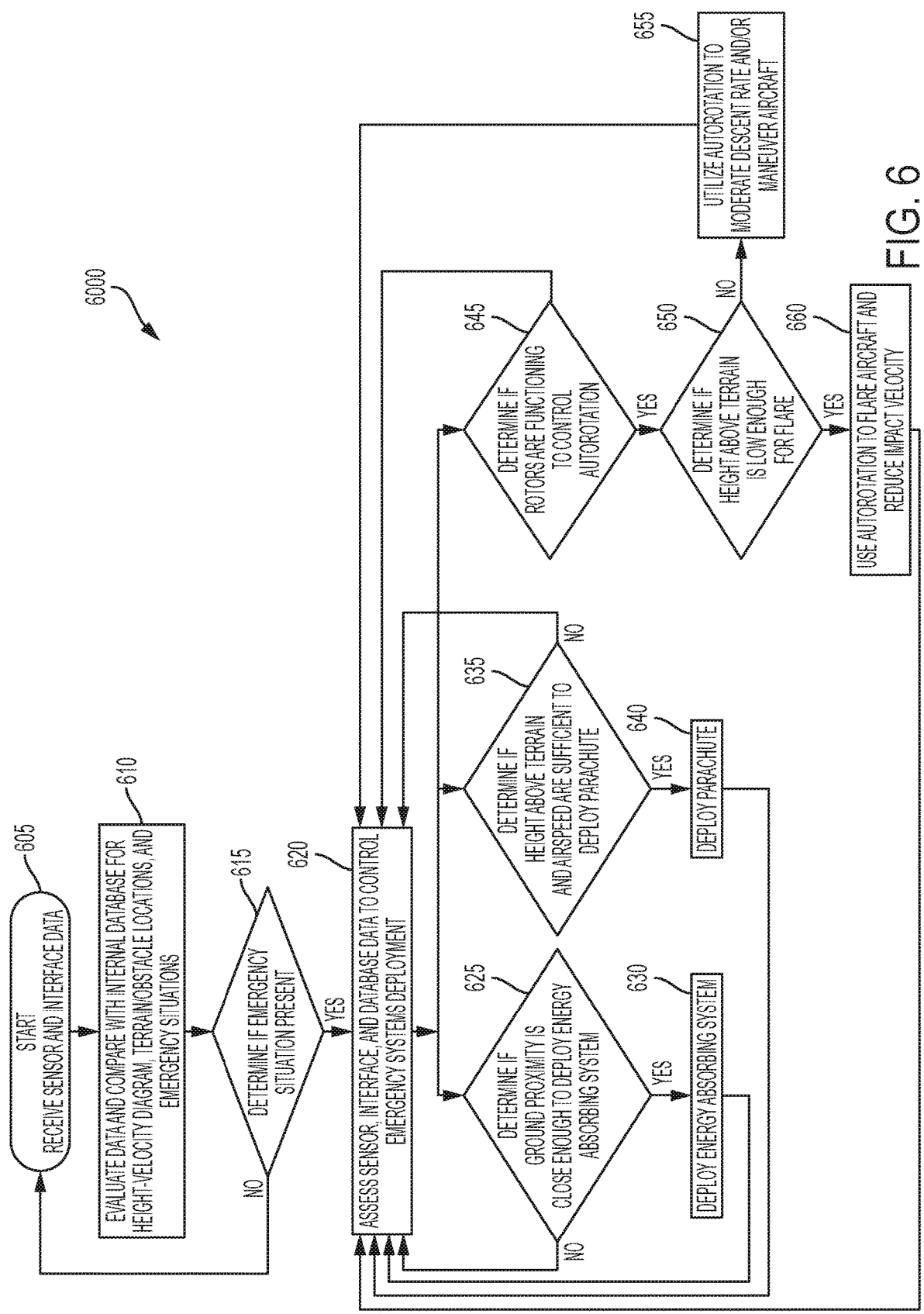
FIG. 6 is a flowchart showing the operation of an automatic emergency control system in accordance with an illustrative embodiment.

FIG. 6 is a flowchart of an aircraft emergency control method 6000 in accordance with an illustrative embodiment. In alternative embodiments, fewer, additional, and/or different operations may be performed. Also, the use of a flow diagram is not meant to be limiting with respect to the order of operations performed. The method 6000 may be implemented in an aircraft as described herein. For example, an aircraft such as the aircraft 1000 of FIG. 1, the aircraft 2000 of FIG. 2, or the aircraft 3000 of FIG. 3 may have a master control unit, such as the master control unit 700 discussed below with respect to FIG. 7, that implements the various aspects of a multi-mode safety system in accordance with the various methods, systems, and computer readable media described herein. The method 6000 shows one possible way in which the multi-mode safety system may be implemented. Computer readable media according the method 6000 may be stored in a memory and executed by a processor such as the master control unit 700 discussed below.

At block 605, the system receives sensor and interface data. For example, the sensor data may include airspeed, altitude, proximity, pressure, temperature, power loss, fire, failure indications, fuel status, or any other sensor data. The system also monitors interface data. The aircraft may, for example, have a graphical user interface (GUI) that allows a passenger, pilot, or more generally a user of the aircraft to input certain data to be monitored. The user may be onboard the aircraft or may be remote from the aircraft. Similarly, the interface such as the GUI may be onboard the aircraft or may be remote from it. The data may be input through the GUI, such as a touchscreen, or through other inputs such as buttons, switches, etc. In this way, the data supplied to the system may be either measured data from sensors or manually input data from a user. In this way, an emergency may be detected by the system automatically based on sensor data or manually through the input of a user.

At block 610, the system evaluates the sensor data and compares the data with an internal database. The internal database includes information about the height-velocity diagram for the aircraft. The height-velocity diagram for the aircraft may be the height-velocity diagram 5000 discussed above with respect to FIG. 5. In other embodiments, different aircraft may have different height-velocity diagrams, as the height-velocity diagram of an aircraft is specific to the precise parameters of the aircraft and the capabilities of the various safety systems installed thereon. Further at block 610, the system monitors for terrain and/or obstacle locations, such as buildings, the ground, water, other air vehicles, etc. Further at block 610, the system monitors information in the database that indicates emergency situations. The database may indicate which parameters, sensor data, etc. indicate an emergency situation. The other aspects monitored by the system at block 610 (e.g., the monitoring of terrain/obstacles and the monitoring of sensor data and interface data) help determine whether an emergency is present.

At block 615, the system determines, based on the various data being evaluated and monitored in block 610, whether an emergency is present. If no emergency exists, the system returns to block 605 to continue to receive sensor and interface data at block 605 and continues to evaluate the data at block 610. The system may determine at block 615 that an emergency exists based on input from a user. The system may also determine that an emergency exists based on sensor data. For example, a sensor may indicate that the aircraft is out of fuel and/or battery power. In an example, a sensor may indicate that there is a fire on or in the aircraft. In an example, a sensor may indicate that certain equipment of the aircraft, such as rotors, motors, or aerodynamic control surfaces, are not functional and/or have been damaged. Other aspects or parameters of the aircraft may also be monitored to detect and determine an emergency situation. For example, one or more engines, motors, actuators, etc. of the aircraft may be monitored using various types of sensors. For example, the system may detect if one or more engines powering one or more rotors is not functioning properly, if the cyclic and/or collective control of one or more rotors is not functioning properly, if a system for rotating the wings and/or nacelles of the rotors is not functioning properly, etc. Any of those factors, or a combination thereof, may be used for the system to determine that an emergency situation exists. In various embodiments, this information about the status of these or other various systems of the aircraft may also be used to determine which safety systems to deploy as described herein. For example, if a system for rotating the wings and/or nacelles of the rotors is not functioning properly, the emergency system may determine that, depending on the current position of the rotors, autorotation may not be implemented. Accordingly, sensors of the aircraft may also monitor aspects of the safety system. If an aspect of the safety system is unusable, an emergency condition may be triggered and/or this may influence how the other aspects of the system are deployed and/or utilized.

At block 620, the system assesses the sensor, interface, and database data to control the emergency systems deployment, as described herein. In an operation not shown in the method 6000, a user may be able to override an emergency situation through an interface. For example, an emergency may be detected, a warning sent to the interface, and the user may have a threshold amount of time to input an override signal into the interface. In other embodiments, a user may not be able to override an emergency detection and subsequent actions taken by the system. In some embodiments, the user is presented only with an option to override the emergency situation in certain types of emergency situations detected by the system. In assessing the sensor, interface, and database data to control the emergency systems deployment, each of blocks 625, 635, and 645 are performed to continuously monitor the aircraft, sensor data, interface data, and database data to ensure that various aspects of the multi-mode safety system are properly deployed and/or utilized to protect passengers/users of the aircraft.

At block 625, the system determines if the ground is close enough to deploy an energy absorbing system. Proximity sensor data may be utilized to determine how close to the ground the aircraft is. Airspeed sensor data may be utilized to determine how fast the aircraft is traveling. The proximity and airspeed data may be utilized to determine when the aircraft will impact the ground and when the energy absorbing system should be deployed (typically just before impact with the ground). In an embodiment, proximity data may also be monitored over time to estimate when the aircraft will impact the ground. In some embodiments, when an emergency situation has been determined, the system may deploy the energy absorbing system within a particular proximity from the ground regardless of the speed or acceleration at which the aircraft is moving toward the ground. That is, the deployment of the energy absorbing system may be based solely on instantaneous data from proximity sensors. In alternate embodiments, an energy absorbing system may be deployed based on altitude sensors/data, either alone or in combination with other sensor data. If the system determines at block 625 that the ground is close enough to deploy the energy absorbing system, it does so at block 630, after which it returns to block 620. If not, the system returns directly to block 620, and continues performing the blocks 625, 635, and 645 to monitor the aircraft for when and how to deploy and/or utilize the various aspects of the multi-mode safety system.

At block 635, the system determines if a height above terrain/ground and the airspeed of the aircraft are sufficient to deploy the parachute. For example, referring to an aircraft with the height-velocity diagram 5000 of FIG. 5, the aircraft may have the proper height and airspeed to deploy the parachute when the aircraft is above the threshold 512. In other words, as shown in FIG. 5, the parachute may be deployed based on a threshold altitude, where that threshold altitude is dependent on the airspeed of the aircraft. Put another way, height at which the parachute may be deployed according to this embodiment varies based on the airspeed of the aircraft. If the system determines at block 635 that the height and airspeed of the aircraft are sufficient to deploy the parachute, the system deploys the parachute at block 640 and returns to block 620. If the aircraft is not determined to be at the proper height and airspeed to deploy the parachute, the system returns to block 620 and does not deploy the parachute.

At block 645, the system determines whether the rotors are functioning to control autorotation. If the rotors of the aircraft are not functioning to control autorotation, the system returns to block 620. Although not shown here, the system may also take steps to allow the rotors to be functional for autorotation. For example, if the rotors are positioned to provide thrust substantially in a horizontal (with respect to the ground) direction as shown in FIG. 2, the system may rotate the wings and/or rotors so that autorotation is available (if rotation of the wings and/or rotors is possible). Similarly, if the rotors are in a position between providing thrust substantially in a horizontal and vertical direction, the rotors and/or wings may be adjusted to provide better functionality with respect to autorotation.

If the system determines that the rotors are functioning to control autorotation at block 645, the system proceeds to block 650 where the system determines whether a height above the terrain is low enough for a flare of the aircraft. If the height above the terrain is low enough as determined in block 650, the system utilizes autorotation of the rotors to flare the aircraft and reduce impact velocity at block 660. If the height above the terrain is not low enough for the flare as determined at block 650, the system utilizes autorotation to moderate the descent rate of the aircraft and/or maneuver the aircraft at block 655. For example, it may be desirable to maneuver the aircraft over a location that is better suited for a non-standard/emergency landing than a current location of the aircraft. In addition to utilizing the autorotation to maneuver the aircraft and/or moderate descent, the system returns to block 620 to continue assessing data related to the aircraft and potentially deploy various aspects of the multi-mode safety system according to blocks 625, 635, and 645.

Figure 7:
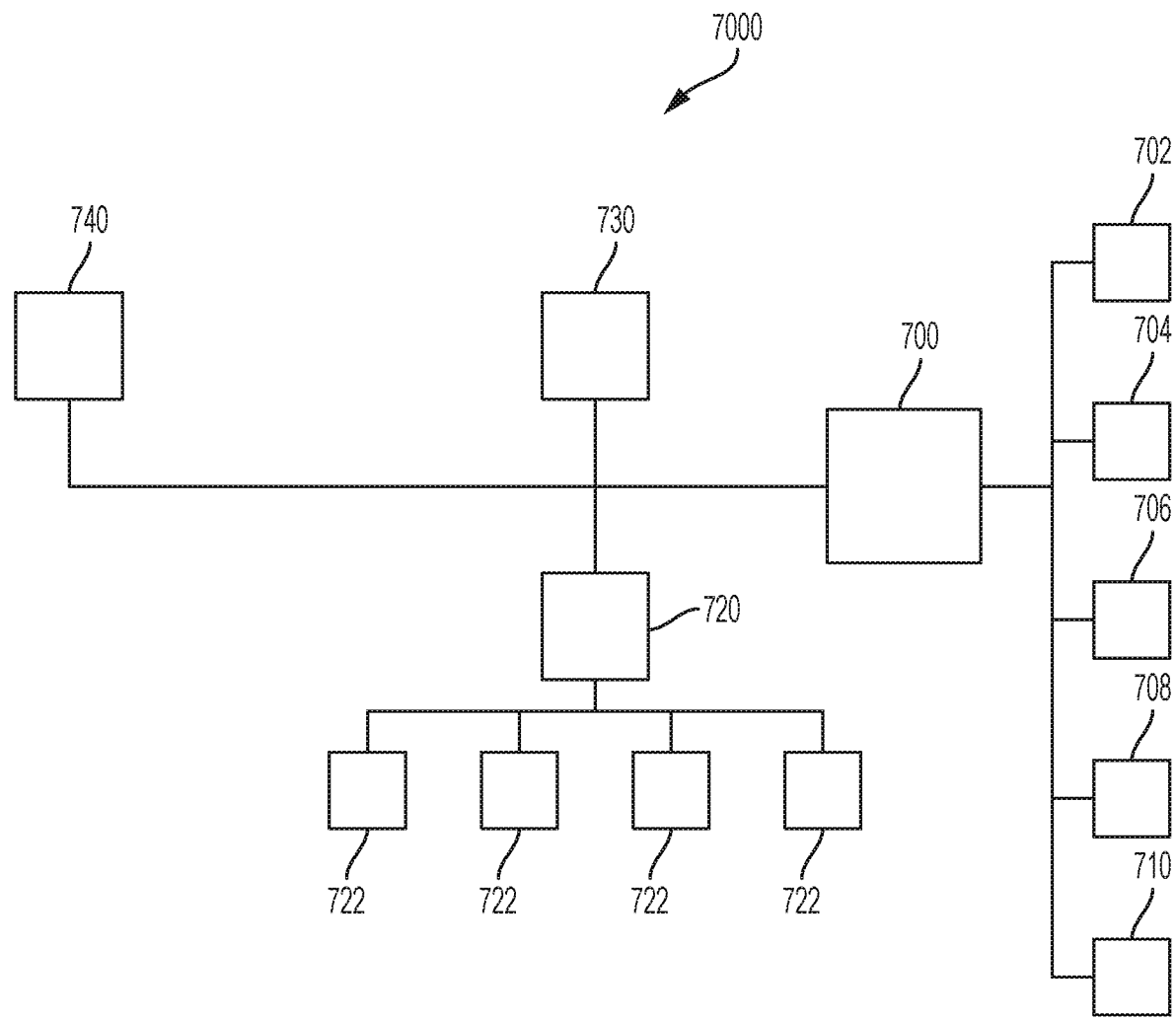
FIG. 7 is a schematic showing the components of an automatic emergency control system in accordance with an illustrative embodiment.

FIG. 7 illustrates an aircraft emergency control system 7000 including a master control unit 700 receiving data from an air data system 702, proximity sensors 704, a human interface 706, a terrain and obstacle database 708, and internal sensors 710. The air data system 702 may include sensors for airspeed and altitude. The proximity sensors 704 may include lidar, radar, and/or vision systems. The human interface 706 may include a display of emergency situations and a graphical user interface and/or buttons/keys for user input to the master control unit 700. The terrain and obstacle database 708 may include data on terrain altitudes, obstacle locations and heights, and water locations. The internal sensors 710 may include sensors for: power loss, fire, systems failure, structural failure, and fuel status. The master control unit 700 utilizes the available data to control the deployment of rotor autorotation by interfacing with an aircraft autopilot 720. The aircraft autopilot 720 controls rotors 722 by commanding cyclic and collective control of the rotors to achieve the desired control of the aircraft commanded by master control unit 700. The master control unit 700 also interfaces with a parachute system 730 and may command deployment of the parachute. Master control unit 700 also interfaces with an energy absorbing system 740 and may command deployment of energy absorbing system 740. The parachute system 730, the rotors 722, and the energy absorbing system 740 are controlled by the master control unit 700 when an emergency condition is detected based on the sensors/inputs 702, 704, 706, 708, and 710. Accordingly, the emergency systems of an aircraft may be controlled according to the various methods described herein using the aircraft emergency control system 7000 of FIG. 7.

The aircraft control system 7000 may include memory with computer readable media stored thereon. Such computer readable media may be computer executable code that is executed by the master control unit 700 to implement the various methods and systems described herein, including implementing the various aspects of the multi-mode safety described herein. The master control unit 700 may be, for example, a computer processor. The instructions stored in a memory and executable by a processor may be implemented to perform various methods, such as methods associated with the aircraft emergency control method 6000 shown in FIG. 6 and described above. In various embodiments, various aspects of the aircraft emergency control system 7000, such as the master control unit 700, the human interface 706, the terrain and obstacle database 708, and/or the aircraft autopilot 720, may be located in the aircraft and/or may be wholly or partially remotely located from the aircraft. Some components/aspects may also be redundant. For example, instances of the master control unit 700 may exist in the aircraft and remotely so that the aircraft itself can determine emergency situations, but an external system may also determine emergency situations. Accordingly, some or all of the control of the emergency systems may be controlled remotely, such as at a remote flight control center.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or from practice of the disclosed embodiments. It is intended that the scope of the invention be defined by the claims appended hereto and their equivalents.

What is claimed is:

1. An aircraft having a safety system, the aircraft comprising:
    a fuselage;
    a passenger seating position within the fuselage;
    a rotor configured for autorotation;
    a parachute attached to the aircraft;
    an energy absorbing system configured to reduce an impact acceleration exerted on the passenger seating position when the fuselage impacts the ground in a substantially horizontal attitude; and
    an automatic emergency control system configured to:
    determine an altitude of the aircraft and an airspeed of the aircraft;
    detect an emergency condition; and
    in response to the detection of the emergency condition:
        when the aircraft is above a threshold altitude upon the detection of the emergency condition, deploy the parachute and rotor autorotation to control a velocity of the fuselage at or below a threshold velocity, wherein the threshold altitude is dependent on the airspeed of the aircraft;
        when the aircraft is at or below the threshold altitude upon the detection of the emergency condition, deploy the rotor autorotation without parachute deployment to control the velocity of the fuselage at or below the threshold velocity, and
        wherein the threshold velocity is determined such that the deployment of the rotor autorotation alone or the deployment of both the rotor autorotation and the parachute, combined with deployment of the energy absorbing system, maintains the impact acceleration exerted on the passenger seating position during an impact below a threshold acceleration.

2. The aircraft of claim 1, wherein a size of the parachute is configured such that when the parachute is deployed, the parachute alone is insufficient to maintain the velocity of the fuselage below the threshold velocity.

3. The aircraft of claim 1, wherein the energy absorbing system is further configured to deploy from beneath the fuselage.

4. The aircraft of claim 1, wherein the automatic emergency control system comprises instructions stored in memory and executable by a processor, the instructions configured to cause the processor to control conditional deployment of the rotor autorotation, the parachute, and/or the energy absorbing system.

5. The aircraft of claim 1, wherein within a predetermined range of operating airspeed and altitude parameters for the aircraft, the size of the parachute is insufficient to reduce the impact acceleration of the passenger seating position below the threshold acceleration without being deployed in conjunction with at least one of the energy absorbing system or the rotor autorotation.

6. The aircraft of claim 1, wherein within a predetermined range of operating airspeed and altitude parameters for the aircraft, the rotor autorotation is insufficient to reduce the impact acceleration of the passenger seating position below the threshold acceleration without being deployed in conjunction with at least one of the energy absorbing system or the parachute.

7. The aircraft of claim 1, wherein within an operational range of operating airspeed and altitude parameters for the aircraft, only two of the three safety systems comprising the rotor autorotation, the parachute, and the energy absorbing system must be operational to reduce the impact acceleration of the passenger seating position below the threshold acceleration.

8. The aircraft of claim 4, wherein the instructions are further configured to cause the processor of the automatic emergency control system to access a database to selectively determine the sequence of deployment of at least two of the rotor autorotation, the parachute, and/or the energy absorbing system based at least in part on the relative position of the aircraft with respect to terrain or obstacles about which information is stored in the database, wherein the database comprises at least one of terrain location, terrain elevation, a terrain type, an obstacle location, an obstacle height, or an obstacle type.

9. The aircraft of claim 4, wherein the instructions are further configured to cause the processor of the automatic emergency control system to send a notification to a user interface upon detection of an emergency situation.

10. The aircraft of claim 9, wherein the instructions are further configured to cause the processor of the automatic emergency control system to receive an emergency override signal from the user interface within a predetermined amount of time from the detection of the emergency situation or the sending of the notification, wherein the emergency override signal is configured to override the deployment of one or more of the parachute, rotor autorotation, or energy absorbing system.

11. The aircraft of claim 9, wherein the instructions are further configured to cause the processor of the automatic emergency control system to deploy the one or more of the parachute, rotor autorotation, or energy absorbing system when an emergency override signal is not received within a predetermined amount of time from the detection of the emergency situation or the sending of the notification.

12. The aircraft of claim 9, wherein the user interface is remotely located outside the aircraft and the notification is made via wireless communication.

13. The aircraft of claim 1, wherein the aircraft further comprises multiple rotors, a portion of an upper side of the fuselage is unobstructed by the multiple rotors, and the deployment system for the parachute is located in the portion of the upper side of the fuselage that is unobstructed by rotors.

14. The aircraft of claim 1, wherein the parachute is configured to impart a maximum parachute deceleration to the passenger seating position, and further wherein the energy absorbing system is configured to impart a maximum energy absorbing system deceleration to the passenger seating position, and wherein the magnitude of the maximum parachute deceleration is substantially similar to the magnitude of the maximum energy absorbing system deceleration.

15. The aircraft of claim 1, wherein the aircraft further comprises multiple rotors, and the rotors are positioned such that autorotation of the rotors may occur when the parachute is in a deployed configuration.

16. The aircraft of claim 1, wherein the threshold acceleration is a threshold acceleration for survivability.

17. A method comprising
   determining, by a processor, an altitude of an aircraft and an airspeed of the aircraft;
   detecting, by the processor, an emergency condition of the aircraft, wherein the aircraft comprises:
      a fuselage,
      a passenger seating position within the fuselage,
      a rotor configured for autorotation,
      a parachute attached to the aircraft, and
      an energy absorbing system configured to reduce an impact acceleration exerted on the passenger seating position when the fuselage impacts the ground in a substantially horizontal attitude; and
   in response to the detecting of the emergency condition:
      when the aircraft is above a threshold altitude upon the detecting of the emergency condition, deploying the parachute and rotor autorotation to control a velocity of the fuselage at or below a threshold velocity, wherein the threshold altitude is dependent on the airspeed of the aircraft; and
      when the aircraft is at or below the threshold altitude upon the detecting of the emergency condition, deploying the rotor autorotation without parachute deployment to control the velocity of the fuselage at or below the threshold velocity,
      wherein the threshold velocity is determined such that the deployment of the rotor autorotation alone or the deployment of both the rotor autorotation and the parachute, combined with deployment of the energy absorbing system, maintains the impact acceleration exerted on the passenger seating position during an impact below a threshold acceleration.

18. The method of claim 17, wherein the threshold acceleration is a threshold acceleration for survivability.

19. A non-transitory computer readable medium having instructions stored thereon that, upon execution by a computing device, cause the computing device to perform operations, wherein the instructions comprise:
   instructions to determine, by a processor, an altitude of an aircraft and an airspeed of the aircraft;
   instructions to detect, by the processor, an emergency condition of the aircraft, wherein the aircraft comprises:
      a fuselage,
      a passenger seating position within the fuselage,
      a rotor configured for autorotation,
      a parachute attached to the aircraft, and
      an energy absorbing system configured to reduce an impact acceleration exerted on the passenger seating position when the fuselage impacts the ground in a substantially horizontal attitude; and
   instructions to, in response to the detection of the emergency condition:
      when the aircraft is above a threshold altitude upon the detection of the emergency condition, deploy the parachute and rotor autorotation to control a velocity of the fuselage at or below a threshold velocity, wherein the threshold altitude is dependent on the airspeed of the aircraft; and
      when the aircraft is at or below the threshold altitude upon the detection of the emergency condition, deploy the rotor autorotation without parachute deployment to control the velocity of the fuselage at or below the threshold velocity,
      wherein the threshold velocity is determined such that the deployment of the rotor autorotation alone or the deployment of both the rotor autorotation and the parachute, combined with deployment of the energy absorbing system maintains the impact acceleration exerted on the passenger seating position during an impact below a threshold acceleration.

20. The non-transitory computer readable medium of claim 19, wherein the threshold acceleration is a threshold acceleration for survivability.

* * * * *